United States Patent
Bang et al.

(10) Patent No.: US 10,624,110 B2
(45) Date of Patent: Apr. 14, 2020

(54) METHOD AND APPARATUS FOR PERFORMING UPLINK SCHEDULING REQUEST BY TERMINAL

(71) Applicants: LG ELECTRONICS INC., Seoul (KR); Korea Advanced Institute of Science and Technology, Daejeon (KR)

(72) Inventors: Inkyu Bang, Seoul (KR); JaYeong Kim, Seoul (KR); Dan Keun Sung, Seoul (KR); Yunjung Yi, Seoul (KR); Kijun Kim, Seoul (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 163 days.

(21) Appl. No.: 15/743,972

(22) PCT Filed: Jul. 14, 2016

(86) PCT No.: PCT/KR2016/007672
§ 371 (c)(1),
(2) Date: Jan. 11, 2018

(87) PCT Pub. No.: WO2017/010825
PCT Pub. Date: Jan. 19, 2017

(65) Prior Publication Data
US 2018/0206256 A1      Jul. 19, 2018

Related U.S. Application Data

(60) Provisional application No. 62/192,065, filed on Jul. 14, 2015.

(51) Int. Cl.
*H04W 72/12* (2009.01)
*H04W 24/08* (2009.01)
(Continued)

(52) U.S. Cl.
CPC ........ *H04W 72/1231* (2013.01); *G06N 5/046* (2013.01); *H04L 5/0005* (2013.01);
(Continued)

(58) Field of Classification Search
None
See application file for complete search history.

(56) References Cited

U.S. PATENT DOCUMENTS 9,215,729 B2 * 12/2015 Ostergaard ........ H04W 72/1284
2010/0008226 A1 * 1/2010 Kang .................... H04W 4/00
370/235

(Continued)

FOREIGN PATENT DOCUMENTS

WO      2015020501      2/2015

*Primary Examiner* — Steve R Young
(74) *Attorney, Agent, or Firm* — Dentons US LLP

(57) ABSTRACT

Provided is a method for selectively performing an uplink scheduling request (SR) by a terminal on the basis of an adaptive uplink channel state threshold value, and an apparatus supporting the same. The terminal may calculate an uplink channel state threshold value on the basis of a variation of a short-term average uplink channel state and a long-term average uplink channel state, determine an uplink channel state predictive value on the basis of a downlink channel state, and determine whether to perform an uplink scheduling request on the basis of the uplink channel state predictive value and the uplink channel state threshold value.

15 Claims, 14 Drawing Sheets

(51) Int. Cl.
  *G06N 5/04* (2006.01)
  *H04L 5/00* (2006.01)
(52) U.S. Cl.
  CPC ....... *H04L 5/0055* (2013.01); *H04W 72/1284* (2013.01); *H04L 5/0048* (2013.01); *H04W 24/08* (2013.01)

(56) References Cited

U.S. PATENT DOCUMENTS

| | | |
|---|---|---|
| 2010/0296472 A1 | 11/2010 | Lee et al. |
| 2013/0322280 A1 | 12/2013 | Pi |
| 2014/0064206 A1 | 3/2014 | Bao et al. |
| 2015/0189644 A1 | 7/2015 | Lorca Hernando |
| 2016/0100360 A1* | 4/2016 | Liu .................. H04W 52/0258 370/311 |
| 2016/0100430 A1* | 4/2016 | Dabeer ............. H04W 28/0278 370/329 |
| 2017/0013565 A1* | 1/2017 | Pelletier ............. H04W 52/343 |

* cited by examiner

FIG. 10

| Case | $\Delta^1_{n-2} = \bar{y}^{n-2} - \bar{y}^{n-3}$ | $\Delta^1_{n-1} = \bar{y}^{n-1} - \bar{y}^{n-2}$ | $\Delta^1_n = \bar{y}^n - \bar{y}^{n-1}$ | $\alpha(\Delta^1_{n-2}, \Delta^1_{n-1}, \Delta^1_n)$ |
|---|---|---|---|---|
| 1 | + | + | + | $+3\delta$ |
| 2 | - | + | + | $+2\delta$ |
| 3 | + | - | + | $+\delta$ |
| 4 | - | - | + | $+\delta$ |
| 5 | + | + | - | $-\delta$ |
| 6 | - | + | - | $-\delta$ |
| 7 | + | - | - | $-2\delta$ |
| 8 | - | - | - | $-3\delta$ |

METHOD AND APPARATUS FOR PERFORMING UPLINK SCHEDULING REQUEST BY TERMINAL

CROSS-REFERENCE TO RELATED APPLICATIONS

This application is the National Stage filing under 35 U.S.C. 371 of International Application No. PCT/KR2016/007672, filed on Jul. 14, 2016, which claims the benefit of U.S. Provisional Application No. 62/192,065 filed on Jul. 14, 2015, the contents of which are all hereby incorporated by reference herein in their entirety.

BACKGROUND OF THE INVENTION

Field of the Invention

The present invention relates to a wireless communication system, and more particularly, to a method for performing, by a user equipment (UE), an uplink scheduling request in a wireless communication system, and an apparatus supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Uplink transmission in LTE system broadly includes two stages: a scheduling request (SR) from a user equipment (UE); and the transmission of an uplink grant from a base station (BS).

When no uplink resource is allocated for a UE, the UE transmits an SR to a BS via a PUCCH, and the BS allocates a resource to the UE through an uplink grant transmitted on a PDCCH. When the UE transmits user data via a PUSCH based on the uplink grant, the BS transmits an ACK upon successfully receiving the user data, thereby completing uplink transmission.

Alternatively, when the UE transmits a buffer state report (BSR) and a power head report (PHR) on a PUSCH, a scheduler of the BS adjusts resources allocated to the UE based on the BSR and the PHR and transmits an uplink grant on a PDCCH. The UE transmits data based on the adjusted uplink grant.

SUMMARY OF THE INVENTION

When traffic occurs, a conventional method, which transmits a scheduling report (SR) regardless of the current channel state, performs uplink transmission even in a poor channel state. This may cause a decrease in service quality and energy efficiency of a user equipment (UE). Therefore, it is needed to propose a method for selectively performing an uplink scheduling request based on an adaptive uplink channel state threshold value.

According to one embodiment, there is provided a method for selectively performing, by a UE, an uplink scheduling request (SR) based on an adaptive uplink channel state threshold value in a wireless communication system. The method may include: calculating an uplink channel state threshold value based on a long-term average uplink channel state and a variation in a short-term average uplink channel state; determining a predicted uplink channel state value based on a downlink channel state; and determining whether to perform an uplink scheduling request based on the predicted uplink channel state value and the uplink channel state threshold value.

The long-term average uplink channel state may be calculated based on N samples, the short-term average uplink channel state may be calculated based on M samples, and the variation in the short-term average uplink channel state may be calculated based on the short-term average uplink channel state, where N may be greater than M.

The uplink channel state threshold value may be adjusted depending on the variation in the short-term average uplink channel state.

When the long-term average uplink channel state is good, the uplink channel state threshold value may be large. When a variation in L successive short-term average uplink channel states is a positive number, the uplink channel state threshold value may increase in proportion to L; and when the variation in L successive short-term average uplink channel states is a negative value, the uplink channel state threshold value may decrease in proportion to L.

The downlink channel state may be calculated based on a downlink reference signal.

When the predicted uplink channel state value is greater than the uplink channel state threshold value, the UE may determine to perform the uplink scheduling request.

A number of uplink scheduling requests is greater than a predetermined maximum number of uplink scheduling requests, the UE may determine to perform the uplink scheduling request.

The method may further include comparing, by the UE, a remaining battery level of the UE with a remaining battery threshold value. The remaining battery level of the UE may be smaller than the remaining battery threshold value. When the remaining battery level is greater than the remaining battery threshold value, the UE may determine to perform the uplink scheduling request.

According to another embodiment, there is provided a UE for selectively performing an uplink scheduling request (SR) based on an adaptive uplink channel state threshold value in a wireless communication system. The UE may include: a memory; a transceiver; and a processor to connect the memory and the transceiver, wherein the processor may be configured to: calculate an uplink channel state threshold value based on a long-term average uplink channel state and a variation in a short-term average uplink channel state; determine a predicted uplink channel state value based on a downlink channel state; and determine whether to perform an uplink scheduling request based on the predicted uplink channel state value and the uplink channel state threshold value.

A UE may selectively transmit a scheduling request based on an adaptive uplink channel state threshold value.

BRIEF DESCRIPTION OF THE DRAWINGS

FIG. 10 shows a method for calculating a threshold value adaptation coefficient according to one embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
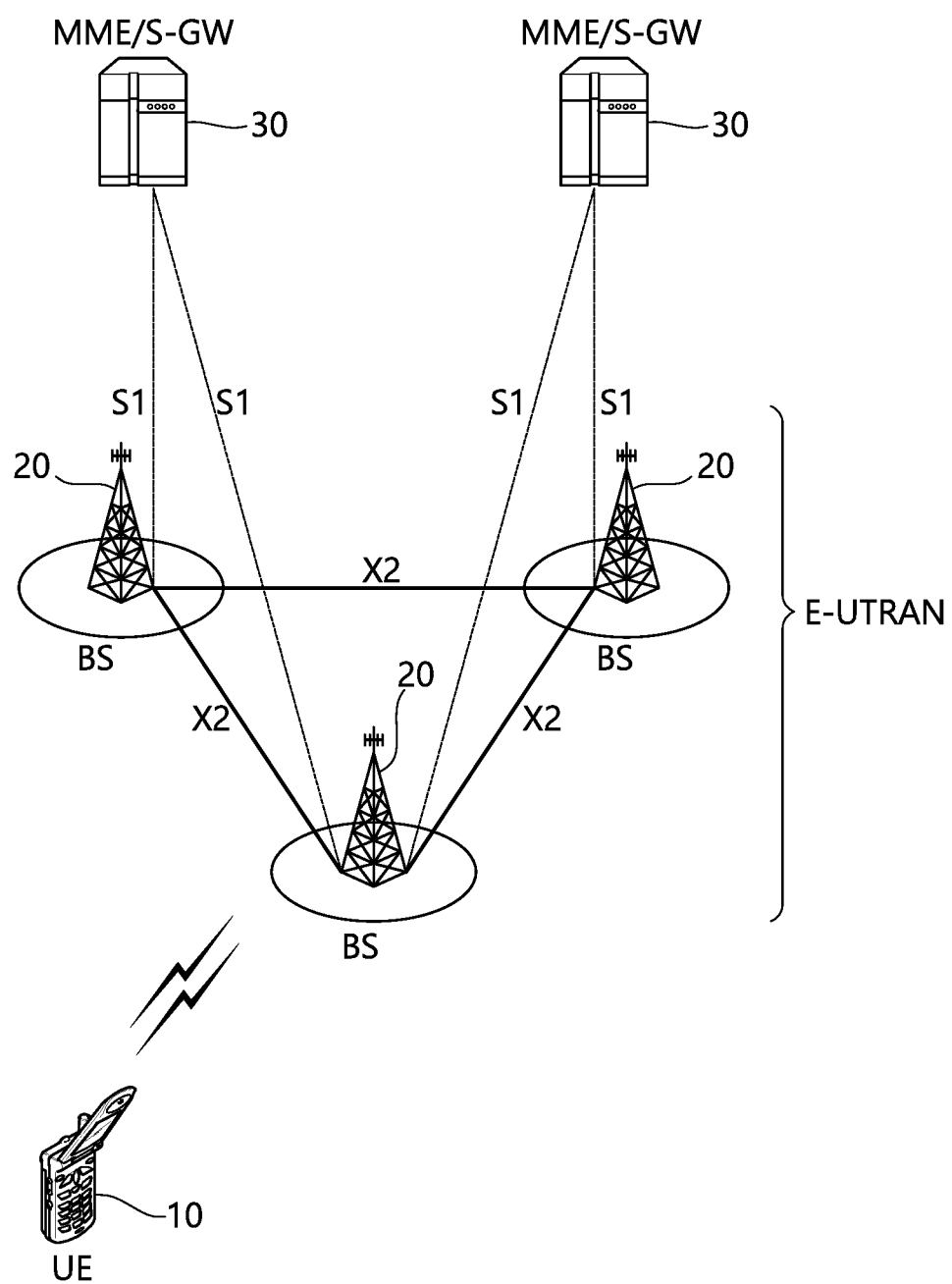
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
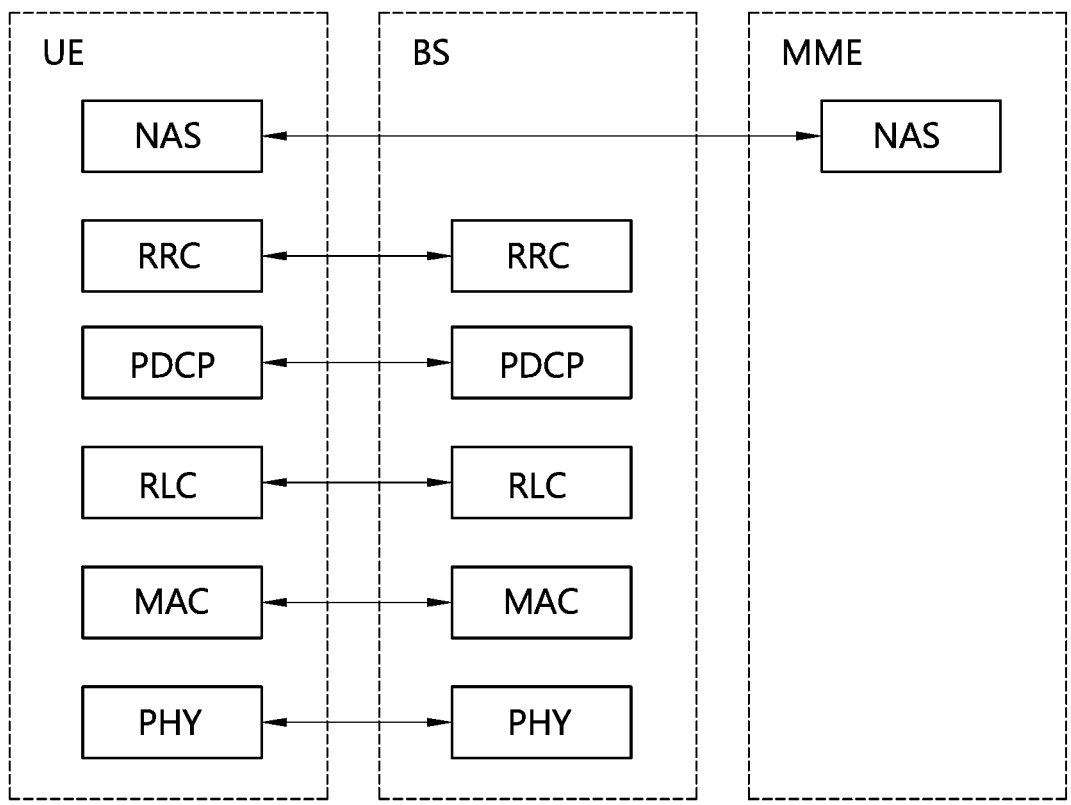
FIG. 2 shows a control plane of a radio interface protocol of an LTE system.
Figure 3:
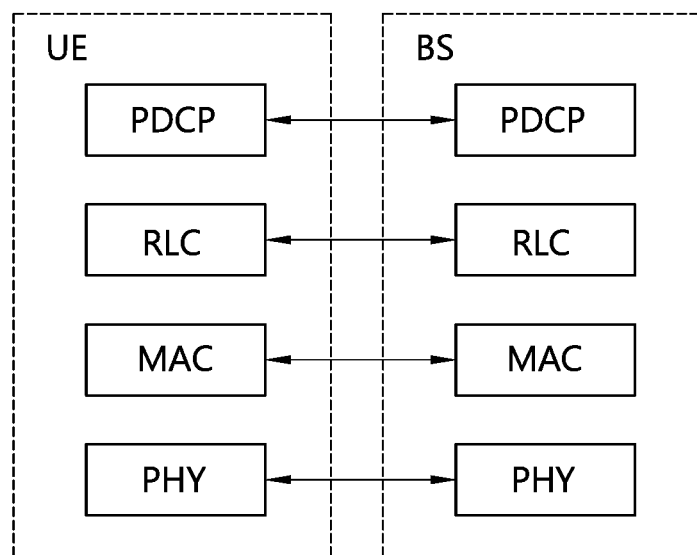
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, uplink transmission is described.

Uplink transmission in LTE system broadly includes a scheduling request (SR) from a UE and the transmission of an uplink grant from a BS.

Figure 4:
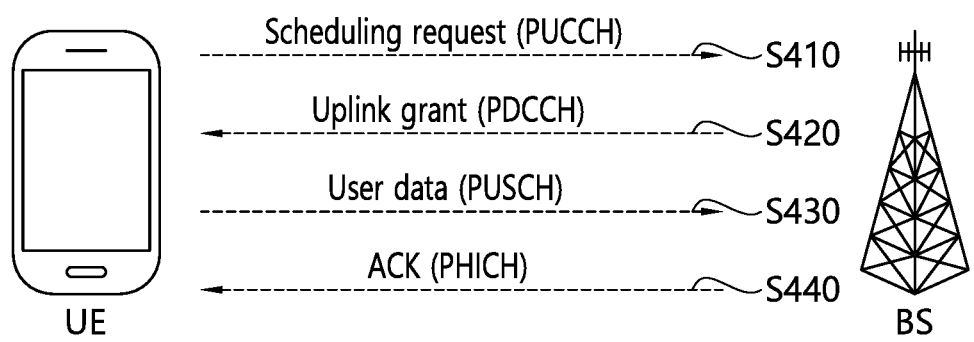
FIG. 4 shows uplink scheduling including a resource allocation process.

FIG. 4 shows uplink scheduling including a resource allocation process.

Referring to FIG. 4, when no uplink resource is allocated for a UE, the UE may transmit an SR to a BS through a PUCCH (S410). Upon receiving the SR, the BS may allocate a resource to the UE through an uplink grant transmitted on a PDCCH (S420). The UE may transmit user data to the BS through a PUSCH based on the uplink grant (S430). Upon successfully receiving the user data, the BS may transmit an ACK to the UE (S440). Accordingly, uplink transmission is completed.

Figure 5:
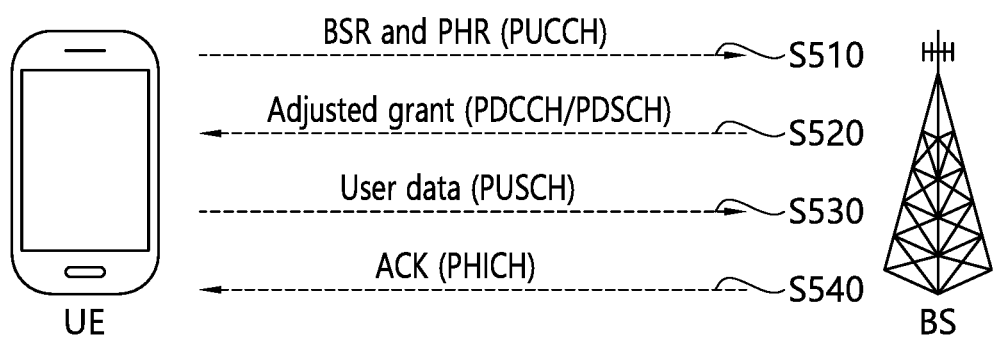
FIG. 5 shows uplink scheduling including a resource adjustment process.

FIG. 5 shows uplink scheduling including a resource adjustment process.

Referring to FIG. 5, a UE may transmit a buffer state report (BSR) and a power head report (PHR) on a PUSCH (S510). A scheduler of a BS may adjust resources allocated to the UE based on the BSR and the PHR and may transmit an uplink grant on a PDCCH (S520). The UE may transmit user data to the BS through a PUSCH based on the adjusted uplink grant (S530). Upon successfully receiving the user data, the BS may transmit an ACK to the UE (S540). Accordingly, uplink transmission is completed.

Figure 6:
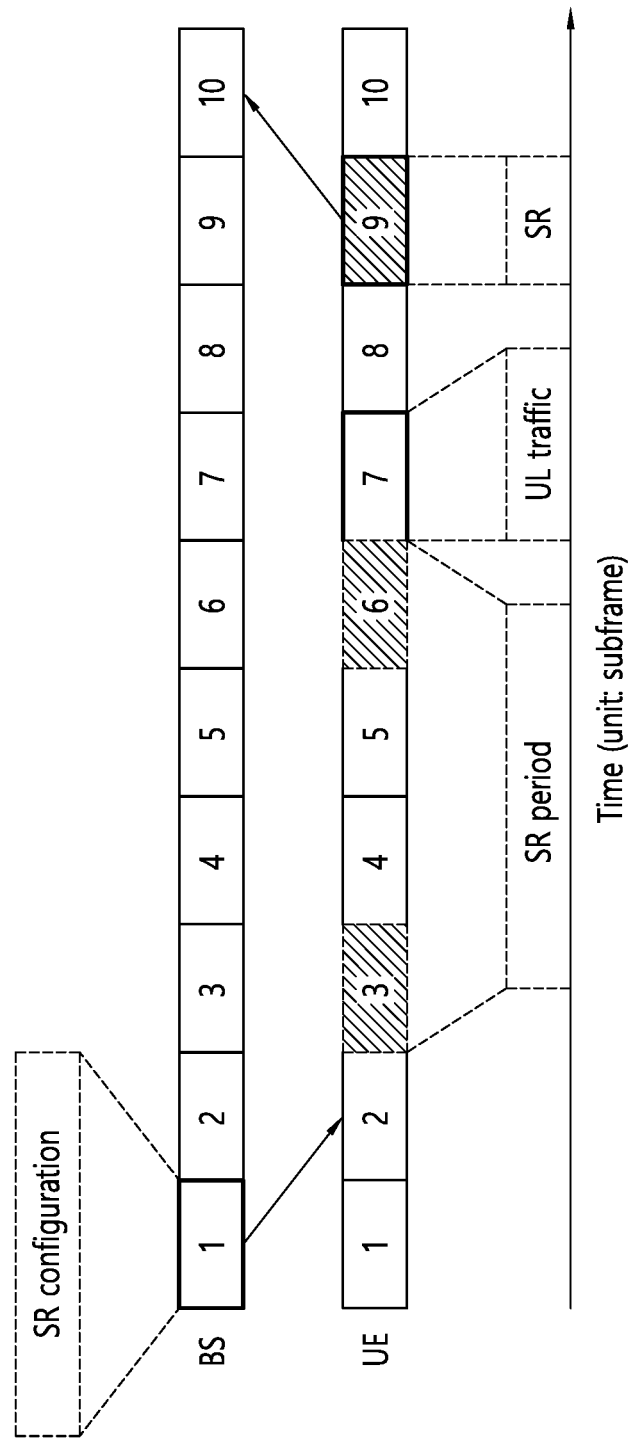
FIG. 6 shows a scheduling request process of a UE on a time axis in subframes.

FIG. 6 shows a scheduling request process of a UE on a time axis in subframes.

Referring to FIG. 6, in subframe 1, a BS transmits SR configuration information to a UE. The SR configuration information may include at least one of a UE's SR-transmitting period (sr-period), the position of an SR-transmitting resource on the frequency and time axes (SR-PUCCH-ResourceIndex, sr-ConfigIndex), and the maximum number of SR transmissions (dsr-TransMax).

The UE may transmit an SR based on an SR configuration. In the embodiment of FIG. 6, suppose that sr-period=3. In subframe 3 and subframe 6, the UE has no uplink data to transmit and thus transmits no SR. When uplink traffic occurs in subframe 7, the UE transmits an SR via a subframe designated by the SR configuration in subframe 9.

As in the above embodiment, when traffic occurs, a conventional method, which transmit a scheduling report (SR) regardless of the current channel state, performs uplink transmission even in a poor channel state. This may cause a decrease in service quality and energy efficiency of a UE. Thus, a new scheduling scheme for transmitting uplink data in a better channel state to improve energy efficiency may be needed particularly for a user sensitive to battery consumption due to a very low remaining battery level.

Hereinafter, a method for a UE to selectively perform an uplink scheduling request based on a channel state and an apparatus supporting the same will be described.

Conventionally, when uplink traffic occurs, the UE transmits an SR via a designated subframe. In order to supplement this manner, an uplink channel state threshold value is newly defined for SR transmission in which at least one of an uplink channel state, a remaining battery level, and the number of SR transmissions is reflected. The uplink channel state threshold value may be adaptively adjusted depending on the UE state.

According to one embodiment of the present invention, a UE may selectively perform an uplink scheduling request based on a channel state. Alternatively, the UE may selectively perform an uplink scheduling request based on a channel state and a remaining battery level. Alternatively, the UE may selectively perform an uplink scheduling request based on an adaptive uplink channel state threshold.

Figure 7:
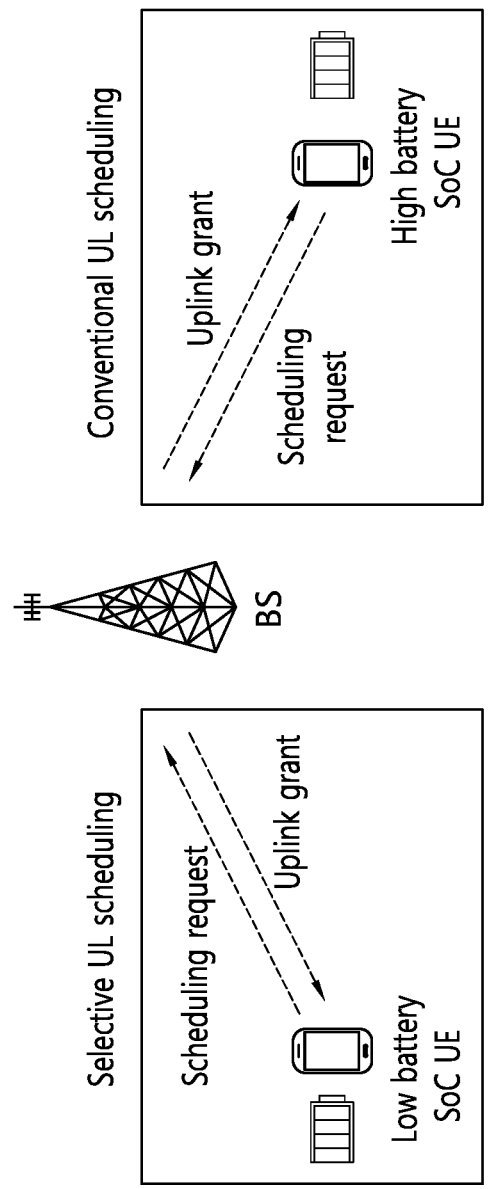
FIG. 7 shows a method for a UE to selectively perform an uplink scheduling request based on a remaining battery level and an adaptive uplink channel state threshold value according to one embodiment of the present invention.

FIG. 7 shows a method for a UE to selectively perform an uplink scheduling request based on a remaining battery level and an adaptive uplink channel state threshold value according to one embodiment of the present invention.

Referring to FIG. 7, the method for the UE to selectively perform the uplink scheduling request may be applied to a UE having a low remaining battery level. However, the method for the UE to selectively perform the uplink scheduling request may not be applied to a UE with a high remaining battery level. According to the embodiment of FIG. 7, users are classified based on the remaining battery level of a UE, the conventional scheduling scheme is applied to users having a sufficient remaining battery level, and the proposed scheduling scheme is discriminately applied to users having a low remaining battery level. Since users with a sufficient remaining battery level are not very sensitive to battery drain, delaying transmission for a good channel state may rather drop a user's QoE. In this case, it may be more effective separately classifying users with a specified remaining battery level or lower and applying the proposed selective scheduling scheme to the users in order to improve the QoE of each user.

Unlike the embodiment of FIG. 7, a method for a UE to selectively performing an uplink scheduling request may be applied to all UEs. In this case, a process of classifying users based on the remaining battery level of a UE may be omitted. Therefore, the proposed scheduling scheme may be applied to all UEs.

Figure 8:
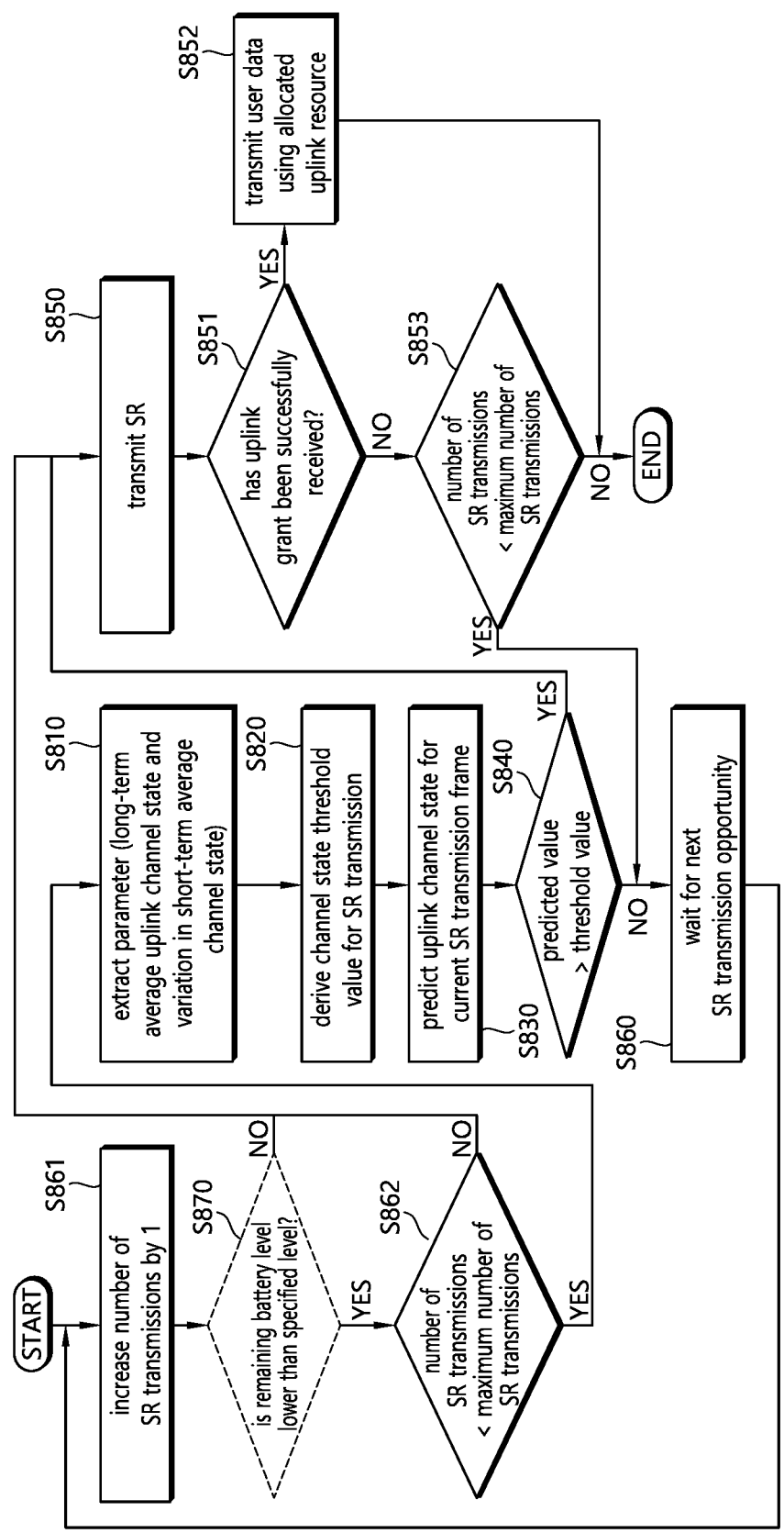
FIG. 8 shows a method for a UE to selectively perform an uplink scheduling request according to one embodiment of the present invention.

FIG. 8 shows a method for a UE to selectively perform an uplink scheduling request according to one embodiment of the present invention.

Referring to FIG. 8, a UE may extract a parameter (S810). The UE may extract at least one parameter of a long-term average uplink channel state, a short-term average uplink channel state, or a variation in short-term average uplink channel state used for the adaptation of an uplink channel state threshold value.

The long-term average uplink channel state may be calculated based on N samples. The short-term average uplink channel state may be calculated based on M samples. The variation in short-term average uplink channel state may be calculated based on the short-term average uplink channel sate. Here, N is a number greater than M.

Figure 9:
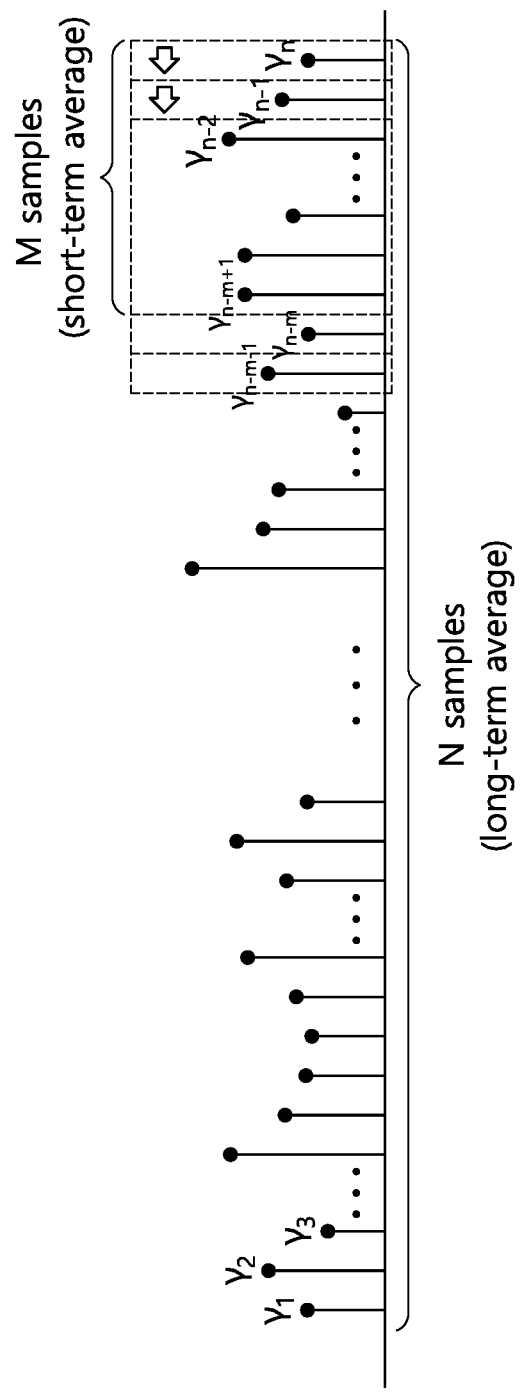
FIG. 9 shows a monitoring method for a UE to calculate a long-term average uplink channel state and a short-term average uplink channel state according to one embodiment of the present invention.

FIG. 9 shows a monitoring method for a UE to calculate a long-term average uplink channel state and a short-term average uplink channel state according to one embodiment of the present invention.

Referring to FIG. 9, there are n samples for calculating a long-term average uplink channel state and a monitoring window of size m for calculating a short-term average uplink channel state. A short-term average uplink channel state based on a moving average may be calculated using the monitoring window of size m.

(1) Long-Term Average Uplink Channel State

A long-term average uplink channel state may be calculated based on a result of observing a total of n samples. That is, the long-term average uplink channel state may be the average of uplink channel states of a total of n samples. The long-term average uplink channel state (r') may be defined by Equation 1.

$$\gamma' = \frac{1}{n}\sum_{i=1}^{n} \gamma_i \quad \text{[Equation 1]}$$

$r_i$ is the uplink channel state of the ith sample, and n is the number of samples.

(2) Short-Term Average Uplink Channel State

A short-term average uplink channel state (r'') may be defined by Equation 2.

$$\gamma'^i = \frac{1}{m}\sum_{j=i-m+1}^{m} \gamma_j = \frac{1}{m}\sum_{j=1}^{m} \gamma_j^i \quad \text{[Equation 2]}$$

$r_j$ is the uplink channel state of the jth sample, and m is the number of samples. $r'^i$ is the average of uplink channel states of m recent samples $r_{i-m+1}, \ldots, r_i$ starting from the ith sample in a sample set. $r_j^i$ is the jth sample of a corresponding monitoring window. Therefore, $r_j^i = r_{i-m+j}$.

(3) Variation in Short-Term Average Uplink Channel State

A variation in short-term average uplink channel state ($\Delta_i^k$) may be calculated based on the difference between the average $r'^i$ of uplink channel states of m previous samples starting from the ith sample and the average $r'^{i-k}$ of uplink channel states of m previous samples starting from the (i–k)th sample. k may vary depending on the characteristics of a channel and a UE. The variation in short-term average uplink channel state ($\Delta_i^k$) may be defined by Equation 3.

$$\Delta_i^k = \gamma'^i - \gamma'^{i-k} \quad \text{[Equation 3]}$$

$r'^i$ is the short-term average uplink channel state of m previous samples starting from the ith sample. $r'^{i-k}$ is the short-term average uplink channel state of m previous samples starting from the (i–k)th sample.

Referring to FIG. 8, the UE may derive an uplink channel state threshold value for SR transmission (S820). The uplink channel state threshold value may be adaptively adjusted. The uplink channel state threshold value may be adaptively adjusted depending on the long-term average uplink channel state and the variation in short-term average uplink channel state. For example, the uplink channel state threshold value may be adaptively applied depending on channel conditions for each user by changing the absolute value and the sign (positive or negative) of an adaptation coefficient (a) according to the variation in short-term average uplink channel state for a UE.

The UE may predict the possibility that the channel state will be improved higher than that at present based on the observation of recent l (1≤l≤n) variations ($\Delta_{n-(l-1)k}^k, \ldots, \Delta_n^k$) among short-term average uplink channel state variations. Further, the UE may adaptively adjust the uplink channel state threshold value based on the prediction.

The uplink channel state threshold value may be calculated based on the long-term average uplink channel state (r') and variations ($\Delta_{n-(l-1)k}^k, \ldots, \Delta_n^k$) in the l recent short-term average uplink channel states. When a threshold value adaptation coefficient is a function of variations ($\Delta_{n-(l-1)k}^k, \ldots, \Delta_n^k$) in short-term average uplink channel state, the uplink channel state threshold value (r*) may be defined by Equation 4.

$$\gamma^* = \gamma' + \alpha(\Delta_{n-(l-1)k}^k, \ldots, \Delta_n^k) \quad \text{[Equation 4]}$$

FIG. 10 shows a method for calculating a threshold value adaptation coefficient according to one embodiment of the present invention.

Referring to FIG. 10, assuming that l=3 and k=1, the UE may calculate a threshold value adaptation coefficient α ($\Delta_{n-2}^1, \Delta_{n-1}^1$, and $\Delta_n^1$). In this case, the UE may determine whether each of $\Delta_{n-2}^1, \Delta_{n-1}^1$, and $\Delta_n^1$ is a positive number or a negative number and may determine the number of successive $\Delta_i^1$ having the same sign based on a variation $\Delta_n^1$ reflecting the latest channel state, thereby determining α ($\Delta_{n-2}^1, \Delta_{n-1}^1, \Delta_n^1$). For example, in the embodiment of the FIG. 10, when all three of recent successive $\Delta_i^1$ are positive numbers (case 1), α=+3δ. When two of recent successive $\Delta_i^1$ are positive numbers (case 2), α=+2δ. When only one latest $\Delta_i^1$ is a positive number (cases 3 and 4), α=+δ. On the contrary, when only one latest $\Delta_i^1$ is a negative number (cases 5 and 6), α=–δ. When two of recent successive $\Delta_i^1$ are negative numbers (case 7), α=–2δ. When all three of recent successive $\Delta_i^1$ are negative numbers (case 8), α=–3δ.

When the channel state variation continues to increase, the channel state can be expected to be improved next time higher than the current channel state, and thus the foregoing method of calculating the threshold value adaptation coefficient is defined. Therefore, the scheduling of the UE can be delayed by increasing the uplink channel state threshold value so that uplink data can be transmitted in a better channel state. On the contrary, when the channel state variation continues to decrease, the channel state is not expected to be improved next time higher than the current channel state. Therefore, the uplink channel state threshold value may be reduced, thereby transmitting data without unnecessary delay.

Referring to FIG. 8, the UE nay predict an uplink channel state for a current SR transmission frame (S830). In a TDD-based LTE system, the UE may predict the uplink channel state using the characteristic of reciprocity between an uplink channel and a downlink channel. The UE may measure a downlink channel state based on a reference signal transmitted from a BS and may predict the uplink channel state based on the measured downlink channel state.

The UE may determine whether to transmit an SR (S840). The UE may determine whether to transmit an SR by comparing a predicted uplink channel state value (r^) and the uplink channel state threshold value (r*). Equation 5 may be defined to determine whether to transmit an SR $$\hat{\gamma} > \gamma^*$$ [Equation 5]

When the predicted uplink channel state value is greater than the uplink channel state threshold value, the UE may transmit an SR to the BS (S850). Thereafter, the UE may determine whether an uplink grant has been successfully received from the BS (S851). When the UE successfully has received the uplink grant, the UE may transmit user data using an allocated uplink resource (S852). When the UE receives no uplink grant, the UE may compare the number of uplink scheduling requests and the maximum number of uplink scheduling requests (S853), which is to prevent a service delay and will be described below in detail.

When the predicted uplink channel state value is smaller than the uplink channel state threshold value, the UE may wait for the next SR transmission opportunity instead of transmitting an SR (S860).

When the predicted uplink channel state value continues to be smaller than the uplink channel state threshold value, the UE may not continuously perform SR transmission, which may lead to a service delay. Therefore, in order to prevent a service delay, the UE may increase the number of uplink scheduling requests even though the UE intentionally transmits no SR (S861). Thereafter, the UE may compare the number of uplink scheduling requests and the maximum number of uplink scheduling requests (S862). When the number of uplink scheduling requests is greater than the maximum number of uplink scheduling requests, the UE may transmit an SR regardless of the channel state (S850). The maximum number of uplink scheduling requests may be defined in advance. That is, in order to achieve scheduling for uplink traffic within the maximum number of SR transmissions ($n^{max}_{SR}$), when the number of SR transmissions ($n_{SR}$) by a user reaches the maximum number of SR transmissions, the UE performs SR transmission regardless of the channel state. Thus, a service delay may be solved.

The proposed selective uplink scheduling request method may be applied to all UEs. Alternatively, the proposed selective uplink scheduling request method may be discriminately applied only to users having a specified remaining battery level or less (S870). Alternatively, the proposed selective uplink scheduling request method may be discriminately applied only to users having a user-centric metric of a specified level or less (S870). Therefore, step S870 is not an essential process but may be considered only when it is intended to reflect the remaining battery level or the user-centric metric in the proposed selective uplink scheduling request method.

Hereinafter, a method for classifying a UE based on the remaining battery level will be described.

Figure 11:
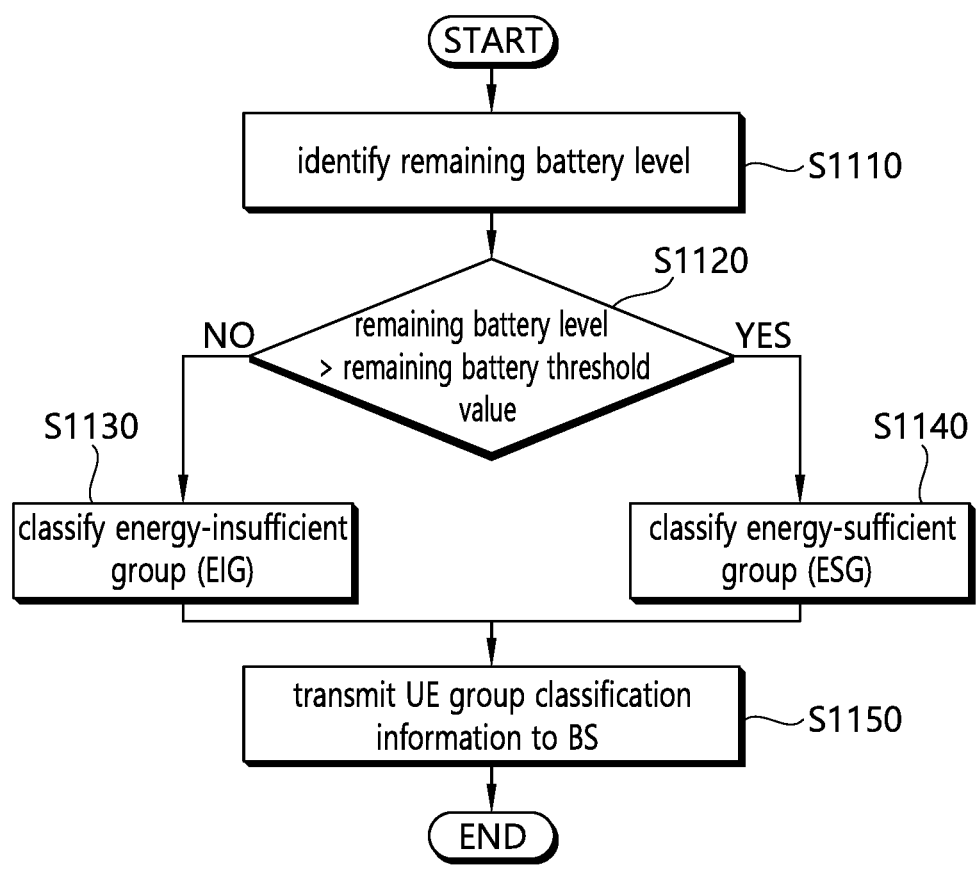
FIG. 11 shows a method for determining a UE group to which a UE belongs based on the remaining battery level according to one embodiment of the present invention.

FIG. 11 shows a method for determining a UE group to which a UE belongs based on the remaining battery level according to one embodiment of the present invention.

Referring to FIG. 11, a UE may identify a remaining internal battery level $I_{SoC}$ thereof (S1110). $I_{SoC}$ may have a value between 0 and 1 depending on the remaining battery level.

The UE may compare the $I_{SoC}$ value with a remaining battery threshold value $I_{TH}$ (S1120). $I_{TH}$ may be a preset value. A system may preset $I_{TH}$. $I_{TH}$ may be set to a different value depending on the situation. The set $I_{TH}$ value may be transmitted to all UEs through a BS. For example, when $I_{TH}$ is set to 0.3, UEs having an insufficient remaining battery level on the basis of a remaining battery level of 30% may be classified. For example, when $I_{TH}$ is set to 0.5, UEs having an insufficient remaining battery level on the basis of a remaining battery level of 50% may be classified. A system with $I_{TH}$ set to 0.5 may be a system that considers the prevention of exhaustion of a battery as more important than a system with $I_{TH}$ set to 0.3.

The UE may compare the $I_{SoC}$ value thereof with the remaining battery threshold value $I_{TH}$ and may determine whether the UE belongs to an energy-insufficient group (EIG) or an energy-sufficient group (ESG) (S1130 and S1140). When the selective uplink scheduling request method proposed in FIG. 8 is discriminately applied only to a user having a certain remaining battery level or lower, the proposed selective uplink scheduling request method may be applied only to a UE classified as an EIG. However, a conventional scheduling request method may be applied to a UE classified as an ESG.

The UE may transmit group classification information on the UE to the BS (S1150). For example, the UE may transmit information on the remaining battery level thereof to the BS Hereinafter, a method for classifying a UE based on a user-centric metric will be described.

A new user-centric metric that can be used in a wireless communication system in order to provide user-centric services may be defined. For example, the user-centric metric may be defined based on the quality of a channel between a UE and a BS. Specifically, the user-centric metric may be defined as a perceived quality function that considers not only the quality of the channel between the UE and the BS but also an estimated data rate based on the channel quality, the power consumption of the UE, and the remaining battery level of the UE. The perceived quality function may be a function of the remaining battery level of the UE and the channel quality. On average, a user having a UE with a low remaining battery level is highly likely to have lower perceived quality than a user having a UE with a high remaining battery level. For example, a perceived quality function that reflects the remaining battery level of a UE or the like may be defined by Equation 6:

$$u(r,p,l_{SoC}) = \omega(l_{SoC})u_R(r) + (1-\omega(l_{SoC}))u_{EE}(r,p,l_{SoC}),$$ [Equation 6]

where r is the data rate of a user, p is power consumption, and $I_{SoC}$ is a remaining battery level. The remaining battery level may be represented by a state-of-charge (SoC) level $I_{SoC}$ and may be defined as a normalized value between 0 and 1. $u_R(r)$ is a function representing perceived quality considering only a data rate and may be defined by Equation 7. $w(I_{SoC})$ is a weight for adjusting the impact of a data rate and power consumption on perceived quality according to the remaining battery level of a UE and may be defined by Equation 8. $u_{EE}(r,p,I_{SoC})$ is a function representing perceived quality considering energy efficiency that reflects power consumption and may be defined by Equation 9.

$$u_R(r) = \frac{1}{\alpha + \beta e^{-\lambda(r-R_0)}} + \delta \qquad \text{[Equation 7]}$$

$\alpha$, $\beta$, $\lambda$, $\delta$, and $R_0$ are design parameters.

$$\omega(l_{SoC}) = \frac{1 - e^{-al_{SoC}}}{1 - e^{-a}} \qquad \text{[Equation 8]}$$

a is a design parameter. By adjusting a, the weight for the impact of a data rate and power consumption on perceived quality may be adjusted.

$$u_{EE}(r, p, l_{SoC}) = \frac{1}{\alpha_{EE} + \beta_{EE} e^{-\lambda_{EE}\left(\frac{r}{p} - \eta_0(l_{SoC})\right)}} + \delta_{EE} \qquad \text{[Equation 9]}$$

$\alpha_{EE}$, $\beta_{EE}$, $\lambda_{EE}$, and $\delta_{EE}$ are design parameters. $\eta_0(I_{SoC})$ is a user-expected value for energy efficiency. $\eta_0(I_{SoC})$ is a function that varies depending on the remaining battery level and may be defined by Equation 10.

$$\eta_0(l_{SoC}) = \frac{d}{c}(e^{-cl_{SoC}} - 1)\eta_{ref} \qquad \text{[Equation 10]}$$

c and d are design parameters. $\eta_{ref}$ is a reference energy efficiency value.

Equations 6 to 10 are examples of a perceived quality function that reflects the remaining battery level of a UE or the like. Equations 6 to 10 are merely examples for explaining that a user-centric metric can be defined as a perceived quality function reflecting the quality of a channel between a UE and a BS and a remaining battery level, the user-centric metric is not limited to the perceived quality function. Furthermore, the user-centric metric is not limited to the quality of a channel between a UE and a BS or a perceived quality function.

When the selective uplink scheduling request method proposed in FIG. 8 is discriminately applied only to users having a user-centric metric of a specified level or less, the proposed selective uplink scheduling request method may be applied only to users having the user-centric metric of the specified level or less. The conventional scheduling request method may be applied to users having the user-centric metric of greater than the specified level.

Figure 12:
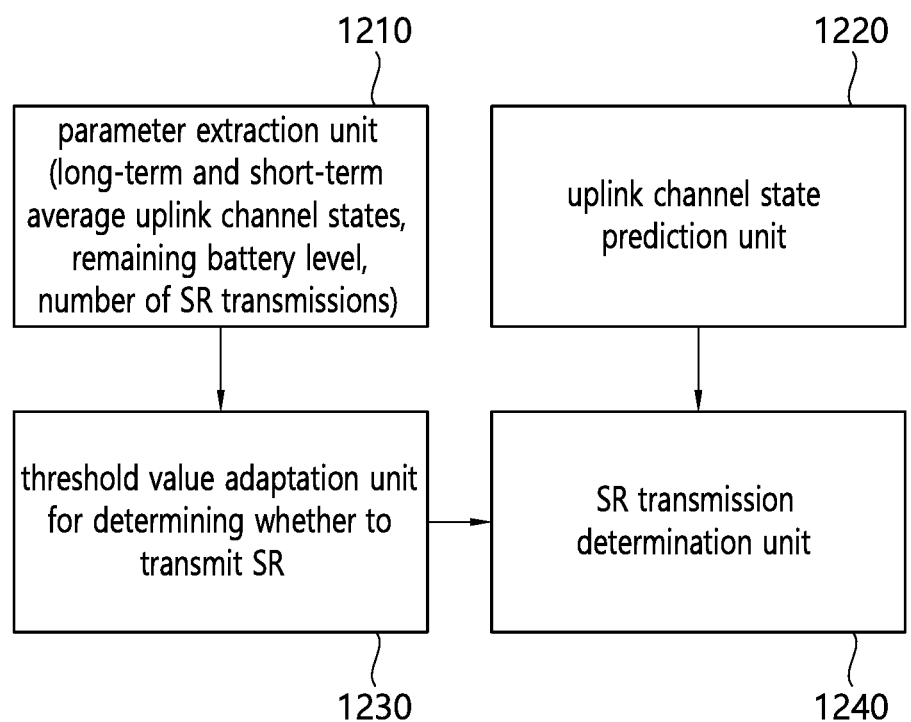
FIG. 12 shows a logical structure of a UE apparatus for selectively performing an uplink scheduling request based on an adaptive uplink channel state threshold value according to one embodiment of the present invention.

FIG. 12 shows a logical structure of a UE apparatus for selectively performing an uplink scheduling request based on an adaptive uplink channel state threshold value according to one embodiment of the present invention.

Referring to FIG. 12, the UE apparatus may include four logical units.

(1) Parameter extraction unit 1210: The parameter extraction unit may extract the long-term average uplink channel state and the short-term average uplink channel state variation of a UE.

(2) Uplink channel state prediction unit 1220: The uplink channel state prediction unit may predict an uplink channel state based on a reference signal transmitted from a BS. The uplink channel state may be predicted based on the characteristic of reciprocity between an uplink channel and a downlink channel in TDD-based LTE.

(3) Threshold value adaptation unit 1230: The threshold value adaptation unit may calculate an uplink channel state threshold value for a user to transmit an SR based on a long-term average uplink channel state and a short-term average uplink channel state variation in order to determine whether to transmit an SR.

(4) SR transmission determination unit 1240: The predicted uplink channel state value calculated by the uplink channel state prediction unit 1220 and the uplink channel state threshold value calculated by the threshold value adaptation unit 1230 may be transmitted to the SR transmission determination unit 1240. The SR transmission determination unit may compare the two values. When the predicted uplink channel state value is greater than the uplink channel state threshold value, the UE may transmit an SR.

According to one embodiment of the present invention, the UE may selectively transmit a scheduling request based on the uplink channel state threshold value. The UE transmits a scheduling request selectively in a good uplink channel state of the uplink channel state threshold value or higher, thereby transmitting uplink data in a better channel environment. Accordingly, the energy efficiency and QoE of the UE may be improved. Further, it is possible to transmit a scheduling request in a better channel state or to prevent an unnecessary scheduling delay by adaptively adjusting the uplink channel state threshold value.

In addition, the UE may transmit information on the remaining battery level thereof to the BS, and the BS may preferentially process an SR from a user having a low remaining battery level. Therefore, selective scheduling may be achieved more efficiently. Using this operation, it is possible to solve a service delay caused by the UE delaying SR transmission for a better channel state.

Figure 13:
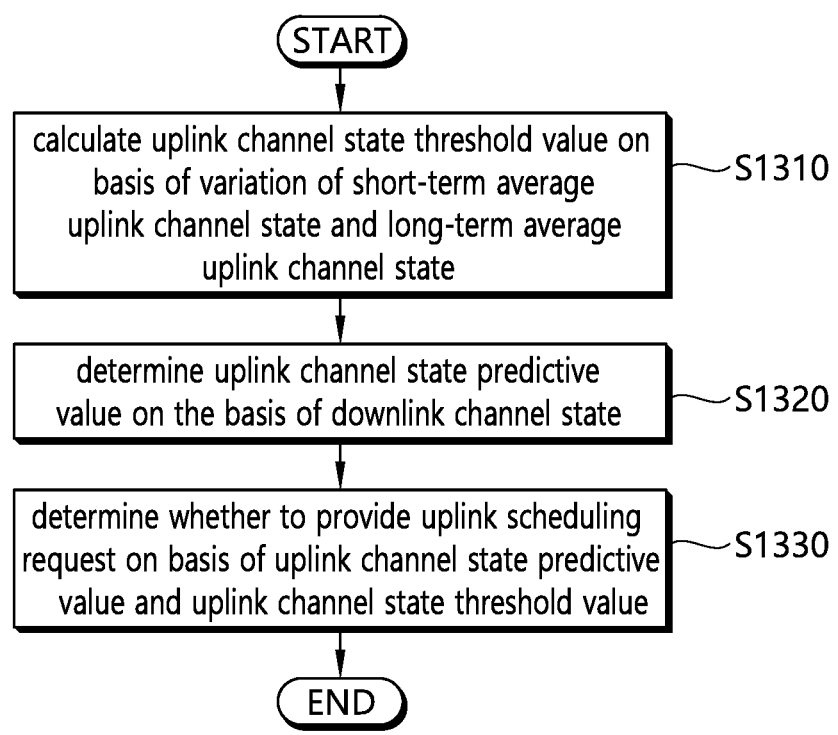
FIG. 13 is a block diagram illustrating a method for a UE to selectively perform an uplink scheduling request based on an adaptive uplink channel state threshold value according to one embodiment of the present invention.

FIG. 13 is a block diagram illustrating a method for a UE to selectively perform an uplink scheduling request based on an adaptive uplink channel state threshold value according to one embodiment of the present invention.

Referring to FIG. 13, the UE may calculate an uplink channel state threshold value based on a long-term average uplink channel state and a variation in short-term average uplink channel state (S1310).

The long-term average uplink channel state may be calculated based on N samples, the short-term average uplink channel state may be calculated based on M samples, and the variation in short-term average uplink channel state may be calculated based on the short-term average uplink channel state, where N is greater than M. The uplink channel state threshold value may be adjusted depending on the variation in short-term average uplink channel state.

When the long-term average uplink channel state is good, the uplink channel state threshold value may be large. When a variation in L successive short-term average uplink channel states is a positive number, the uplink channel state threshold value may increase in proportion to L. When the variation in L successive short-term average uplink channel states is a negative value, the uplink channel state threshold value may decrease in proportion to L.

The UE may determine a predicted uplink channel state value based on a downlink channel state (S1320). The downlink channel state may be calculated based on a downlink reference signal.

The UE may determine whether to perform an uplink scheduling request based on the predicted uplink channel state value and the uplink channel state threshold value (S1330).

When the predicted uplink channel state value is greater than the uplink channel state threshold value, the UE may determine to perform the uplink scheduling request.

When the number of uplink scheduling requests is greater than the predetermined maximum number of uplink scheduling requests, the UE may determine to perform the uplink scheduling request.

The UE may further compare the remaining battery level of the UE with a remaining battery threshold value. The remaining battery level of the UE may be smaller than the remaining battery threshold value. When the remaining battery level is greater than the remaining battery threshold value, the UE may determine to perform the uplink scheduling request.

The long-term average uplink channel state (r') may be defined as follows.

$$\gamma' = \frac{1}{n}\sum_{i=1}^{n}\gamma_i$$

$r_i$ is the uplink channel state of the ith sample, and n is the number of samples.

The short-term average uplink channel state ($r''^i$) may be defined as follows.

$$\gamma''^i = \frac{1}{m}\sum_{j=i-m+1}^{m}\gamma_j$$

$r_j$ is the uplink channel state of the jth sample, m may be the number of samples, and n may be greater than m.

The variation in short-term average uplink channel state ($\Delta_i^k$) may be defined as follows.

$$\Delta_i^k = \gamma''^i - \gamma''^{i-k}$$

$r''^i$ may be the short-term average uplink channel state of m previous samples starting from the ith sample. $r''^{i-k}$ may be the short-term average uplink channel state of m previous samples starting from the (i–k)th sample.

The uplink channel state threshold value (r*) may be defined as follows.

$$\gamma^* = \gamma' + \alpha(\Delta_{n-(l-1)k}^k, \ldots, \Delta_n^k)$$

$\alpha(\bullet)$ may be a threshold value adaptation function of adjusting the channel state threshold value based on 1 ($1 \leq l \leq n$) variations.

Figure 14:
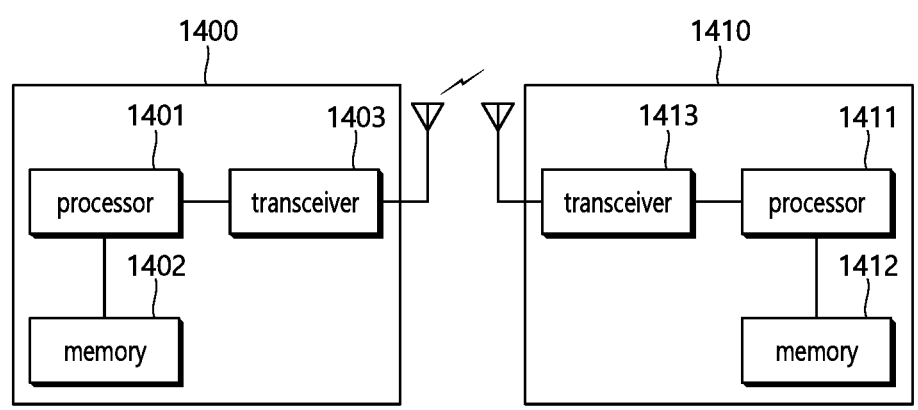
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402 and a transceiver 1403. The memory 1402 is connected to the processor 1401, and stores various types of information for driving the processor 1401. The transceiver 1403 is connected to the processor 1401, and transmits and/or receives radio signals. The processor 1401 implements proposed functions, processes and/or methods. In the above embodiment, an operation of the base station may be implemented by the processor 1401.

A UE 1410 includes a processor 1411, a memory 1412 and a transceiver 1413. The memory 1412 is connected to the processor 1411, and stores various types of information for driving the processor 1411. The transceiver 1413 is connected to the processor 1411, and transmits and/or receives radio signals. The processor 1411 implements proposed functions, processes and/or methods. In the above embodiment, an operation of the UE may be implemented by the processor 1411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for selectively performing, by a user equipment (UE), an uplink scheduling request (SR) based on an adaptive uplink channel state threshold value in a wireless communication system, the method comprising:
   obtaining an uplink channel state threshold value based on a long-term average uplink channel state and a variation in a short-term average uplink channel state;
   determining a predicted uplink channel state value based on a downlink channel state; and
   determining whether to perform an uplink scheduling request based on the predicted uplink channel state value and the uplink channel state threshold value,
   wherein the UE makes the determination to perform the uplink scheduling request based on a number of the uplink scheduling requests being greater than a predetermined maximum number of the uplink scheduling requests.

2. The method of claim 1, wherein the long-term average uplink channel state is obtained based on N samples, the short-term average uplink channel state is obtained based on M samples, and the variation in the short-term average uplink channel state is obtained based on the short-term average uplink channel state, where N is greater than M.

3. The method of claim 2, wherein the uplink channel state threshold value is adjusted based on the variation in the short-term average uplink channel state.

4. The method of claim 2, wherein the uplink channel state threshold value, when the long-term average uplink channel state is good, is higher than the uplink channel state threshold value when the long-term average uplink channel state is bad.

5. The method of claim 4,
wherein based on a variation in contiguous L short-term average uplink channel states which is a positive number, the uplink channel state threshold value increases in proportion to L, and
wherein based on the variation in contiguous L short-term average uplink channel states which is a negative value, the uplink channel state threshold value decreases in proportion to L.

6. The method of claim 3, wherein the downlink channel state is obtained based on a downlink reference signal.

7. The method of claim 3, wherein the UE makes a determination to perform the uplink scheduling request based on the predicted uplink channel state value being greater than the uplink channel state threshold value.

8. The method of claim 3, further comprising:
comparing, by the UE, a remaining battery level of the UE with a remaining battery threshold value.

9. The method of claim 8, wherein the remaining battery level of the UE is smaller than the remaining battery threshold value.

10. The method of claim 8, wherein the UE makes a determination to perform the uplink scheduling request based on the remaining battery level being greater than the remaining battery threshold value.

11. The method of claim 1, wherein the long-term average uplink channel state (r') is obtained as follows:

$$\gamma' = \frac{1}{n}\sum_{i=1}^{n} \gamma_i$$

where $r_i$ is an uplink channel state of an $i^{th}$ sample, and n is a number of samples.

12. The method of claim 11, wherein the short-term average uplink channel state (r") is obtained as follows:

$$\gamma'^i = \frac{1}{m}\sum_{j=i-m+1}^{m} \gamma_j$$

where $r_j$ is an uplink channel state of a $j^{th}$ sample, m is a number of samples, and n may be greater than m.

13. The method of claim 12, wherein the variation in short-term average uplink channel state ($\Delta_i^k$) is obtained as follows;

$$\Delta_i^k = \gamma'^i - \gamma'^{i-k}$$

where $r'^i$ is a short-term average uplink channel state of m previous samples starting from an $i^{th}$ sample, and $r'^{i-k}$ is a short-term average uplink channel state of m previous samples starting from an (i–k)th sample.

14. The method of claim 13, wherein the uplink channel state threshold value (r*) is obtained as follows:

$$\gamma^* = \gamma' + \alpha(\Delta_{n-(l-1)k}^k, \ldots, \Delta_n^k)$$

where $\alpha(\bullet)$ is a threshold value adaptation function of adjusting the channel state threshold value based on l (1≤l≤n) variations.

15. A user equipment (UE) for selectively performing an uplink scheduling request (SR) based on an adaptive uplink channel state threshold value in a wireless communication system, the UE comprising:
a memory;
a transceiver; and
a processor to connect the memory and the transceiver,
wherein the processor is configured to:
obtain an uplink channel state threshold value based on a long-term average uplink channel state and a variation in a short-term average uplink channel state;
determine a predicted uplink channel state value based on a downlink channel state; and
determine whether to perform an uplink scheduling request based on the predicted uplink channel state value and the uplink channel state threshold value,
wherein the determination to perform the uplink scheduling request based on a number of the uplink scheduling requests being greater than a predetermined maximum number of the uplink scheduling requests.

* * * * *